(12) United States Patent
Chan et al.

(10) Patent No.: US 7,203,030 B2
(45) Date of Patent: Apr. 10, 2007

(54) SYSTEM, METHOD, AND APPARATUS FOR AERODYNAMIC DIVERTER INTEGRATED WITH A DIFFUSER IN A BYPASS CHANNEL FOR APPLICATIONS IN A DISK STORAGE DEVICE

(75) Inventors: Andre Sirilutporn Chan, Milpitas, CA (US); Ferdinand Hendriks, Morgan Hill, CA (US); Michael Robert Hatchett, San Jose, CA (US); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 402 days.

(21) Appl. No.: 10/811,682

(22) Filed: Mar. 29, 2004

(65) Prior Publication Data

US 2005/0041332 A1   Feb. 24, 2005

Related U.S. Application Data

(63) Continuation-in-part of application No. 10/644,172, filed on Aug. 20, 2003.

(51) Int. Cl.
G11B 33/14 (2006.01)
(52) U.S. Cl. .................. 360/97.02; 360/97.03
(58) Field of Classification Search ............. 360/97.01, 360/97.02, 97.03
See application file for complete search history.

(56) References Cited

U.S. PATENT DOCUMENTS

| | | | |
|---|---|---|---|
| 3,720,931 A | 3/1973 | Andersen | |
| 4,369,475 A | 1/1983 | Ho et al. | |
| 4,489,356 A * | 12/1984 | Farmer | 360/97.02 |
| 4,587,645 A | 5/1986 | Wong et al. | |
| 5,031,059 A | 7/1991 | Yamaguchi et al. | |
| 5,134,530 A | 7/1992 | Hall | |
| 5,140,578 A | 8/1992 | Tohkairin | |
| 5,907,453 A | 5/1999 | Wood et al. | |
| 6,091,570 A | 7/2000 | Hendriks | |
| 6,208,484 B1 | 3/2001 | Voights | |
| 6,362,937 B1 | 3/2002 | Gibbs et al. | |
| 6,417,986 B1 | 7/2002 | Tran et al. | |
| 6,487,038 B1 | 11/2002 | Izumi et al. | |
| 6,600,626 B2 | 7/2003 | Shimizu et al. | |
| 6,728,062 B1 * | 4/2004 | Ou-Yang et al. | 360/97.02 |
| 6,788,493 B1 * | 9/2004 | Subramaniam et al. | 360/97.02 |

(Continued)

FOREIGN PATENT DOCUMENTS

JP    61151892    7/1986

(Continued)

Primary Examiner—William J Klimowicz
(74) Attorney, Agent, or Firm—Bracewell & Giuliani LLP

(57) ABSTRACT

A device streamlines air flow inside a hard disk drive with a stationary afterbody that is located adjacent to each of the disks. A diverter portion of the device enhances the volumetric flow of air through the diffuser. The overall function of the device effectively expands the air flow so that the speed of the air flow gradually decreases while pressure increases. This design reduces losses in system momentum due to sudden expansion of the air in the drive. In addition, air flow moving toward the disk pack may be contracted to allow efficient energy conversion from pressure energy to kinetic energy prior to merging of the bypass air flow with the air flow among the disks.

19 Claims, 5 Drawing Sheets

U.S. PATENT DOCUMENTS

| | | | |
|---|---|---|---|
| 6,898,048 B2 * | 5/2005 | Adams et al. | 360/97.02 |
| 6,999,273 B2 * | 2/2006 | Tsang et al. | 360/97.02 |
| 7,057,851 B2 * | 6/2006 | Sun et al. | 360/97.02 |
| 7,123,439 B2 * | 10/2006 | Chan et al. | 360/97.02 |
| 2002/0075591 A1 | 6/2002 | Chang et al. | |
| 2002/0149876 A1 | 10/2002 | Sakata et al. | |
| 2004/0252405 A1 * | 12/2004 | Sun et al. | 360/97.02 |
| 2005/0041329 A1 * | 2/2005 | Chan et al. | 360/97.02 |
| 2005/0041332 A1 * | 2/2005 | Chan et al. | 360/97.02 |
| 2006/0028760 A1 * | 2/2006 | Zuo et al. | 360/97.02 |
| 2006/0066992 A1 * | 3/2006 | Chan et al. | 360/97.03 |

FOREIGN PATENT DOCUMENTS

| | | |
|---|---|---|
| JP | 61198485 | 9/1986 |
| JP | 62022290 | 1/1987 |
| JP | 62076089 | 4/1987 |
| JP | 62085997 | 6/1987 |
| JP | 6355299 | 4/1988 |
| JP | 1144286 | 6/1989 |
| JP | 1133392 | 9/1989 |
| JP | 1170399 | 12/1989 |
| JP | 3054791 | 3/1991 |
| JP | 5347089 | 12/1993 |
| JP | 2001023347 A * | 1/2001 |
| JP | 2002109858 A * | 4/2002 |
| JP | 2002124062 | 4/2002 |
| JP | 2002133827 A * | 5/2002 |
| JP | 2002208270 A * | 7/2002 |
| JP | 2003257155 | 9/2003 |

* cited by examiner

SYSTEM, METHOD, AND APPARATUS FOR AERODYNAMIC DIVERTER INTEGRATED WITH A DIFFUSER IN A BYPASS CHANNEL FOR APPLICATIONS IN A DISK STORAGE DEVICE

This application is a continuation-in-part of U.S. patent application Ser. No. 10/644,172, filed on Aug. 20, 2003, entitled, Hard Disk Drive with Aerodynamic Diffuser, Contraction, and Fairing for Disk Base and Re-acceleration Drag Reduction, and is incorporated herein by reference.

BACKGROUND OF THE INVENTION

1. Technical Field

The present invention relates in general to an improved disk storage device and, in particular, to an improved system, method, and apparatus for integrating an aerodynamic diverter with a bypass channel in a disk storage device.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. One to six disks are usually stacked on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the prior art, a number of solutions have been proposed to enhance the air flow within hard disk drives, such as bypass channels located adjacent to the disk pack. For example, Japanese Patent JP53-47089, to Yasuaki, reveals a hard disk device in which air guides 20, 30 only guide a central portion of the flow of air back to the disks. Japanese Patent JP62-85997, to Wakatsuki, discloses a magnetic disk device (FIGS. 3–5) in which a housing 31 with doors 20 guides the flow of air from the disks to a filter. U.S. Pat. No. 5,907,453, to Wood, reveals diverter ramps 220, 222 (FIG. 9) that also only affect a central portion of the air flow.

Currently known implementations of bypass channels such as these force a sudden widening of the air flow cross-section by as much as 50%. The sum of the thicknesses of the disk(s) in the disk pack is a significant fraction of the height of the bypass channel in the direction of the spindle axis. As a result, present designs cause objectionable disk base drag due to the disk wakes in the bypass channel. Moreover, there is also objectionable drag due to re-acceleration of the slow, bypass air flow around the actuator. Thus, an improved solution for streamlining air flow within a hard disk drive would be desirable.

SUMMARY OF THE INVENTION

One embodiment of a system, method, and apparatus for streamlining air flow inside of a hard disk drive is disclosed. The air flow is guided into a bypass channel. Each disk is provided with a stationary afterbody. The afterbody is shaped such that an expanding duct is created for the flow coming off each disk. An expanding aerodynamic duct or diffuser provides a gradually expanding passage so that the speed of the air flow can gradually, rather than abruptly, decrease and the pressure can rise. A set of flow diverter fins are integrally formed with the diffuser and extend between the disks to extract more air mass out of the disk stack. The fins reduce flow-induced vibration of the disks and actuator arm. This design reduces losses in system momentum due to sudden expansion of the air or gas in the drive.

The present invention also ensures a smooth recovery process of pressure from kinetic energy in the entering flow field, which reduces the amount of power required by the spindle motor. The downstream diffuser and flow diverter fins receive air flow spun off the disks while reducing the rate of cross sectional expansion, and consequential turbulence, of the air as it travels from among the disk surfaces around the actuator and non-aerodynamic disk drive components. Upon return of the bypass flow to the disk pack, air flow reentering the disk pack is accelerated in a channel of diminishing cross section to allow efficient energy conversion from pressure energy to kinetic energy prior to merging of the bypass air flow with the air flow among the disks.

The present invention utilizes a comb-like structure with fins that protrude into the spinning disk pack. In one embodiment, the structure fulfills an aerodynamic function only. However, the structure may also be configured to perform a filtration function, in which case the structure may be formed from a filtration substance. The efficacy of the filtration material may be enhanced, for example, by incorporation of electric charges (electret). The structure may be provided with linear or rounded tapers. However, smooth, edge-free tapers are desirable. For example, since the contraction is required to re-accelerate the air flow into the disk pack, the leading edges of the contraction are preferably rounded.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
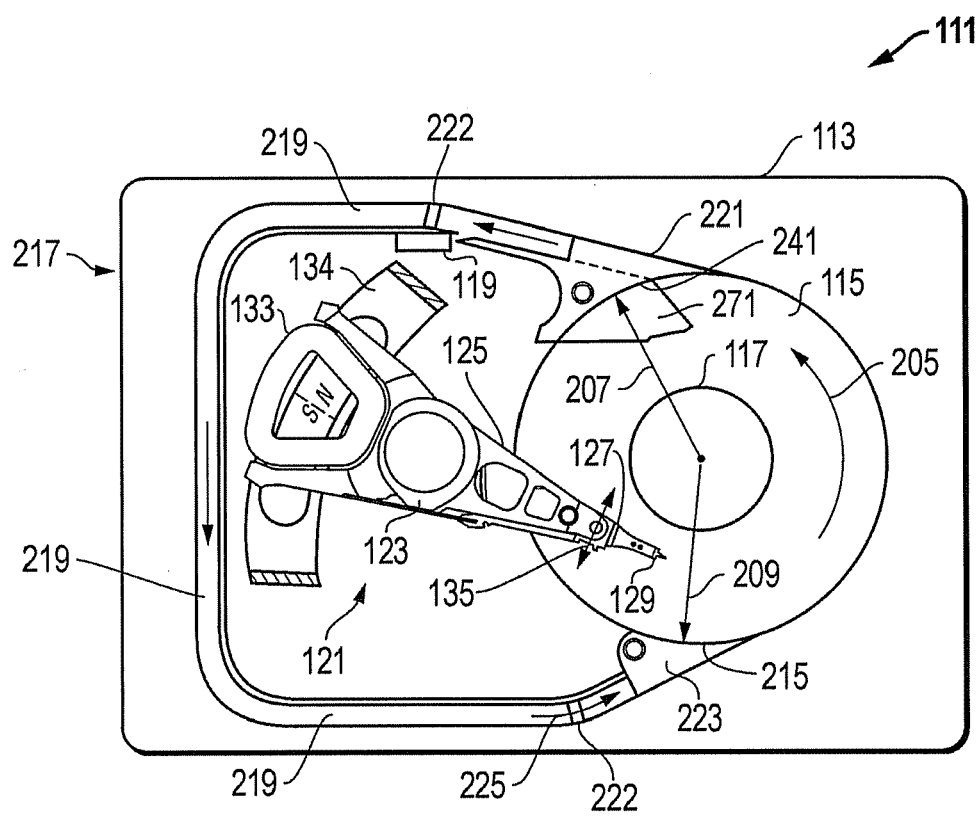
FIG. 1 is a schematic, top plan view of a hard disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. The disk or disks 115 are rotated (see arrows 205) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
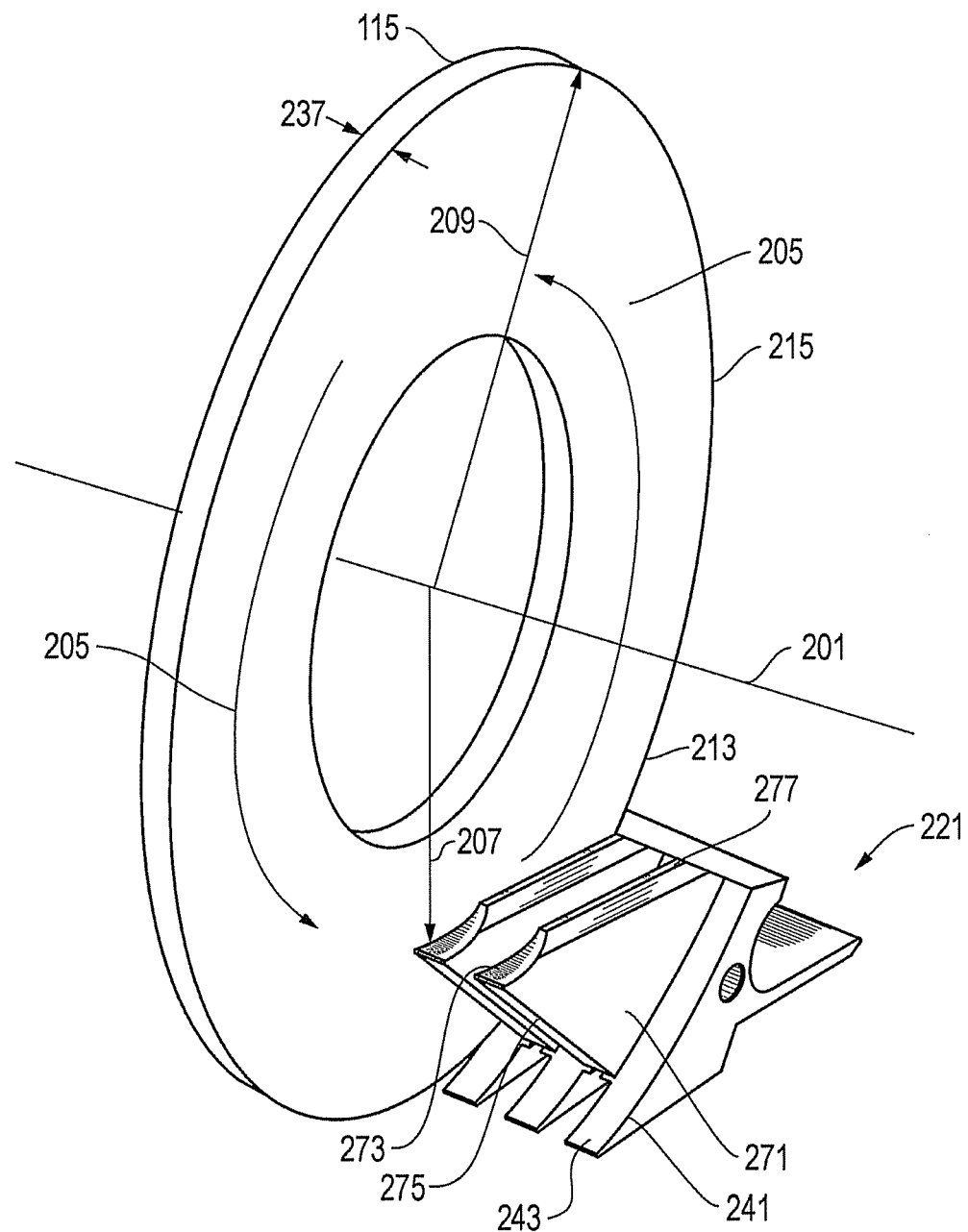
FIG. 4 is a front isometric view of the diffuser of FIG. 2 showing one of the adjacent disks, and is constructed in accordance with the present invention.

Referring now to FIGS. 1 and 4, the disk pack and disks 115 (one shown) define an axis 201 of rotation 205 and radial directions 207, 209, relative to the axis 201. The disk pack and disks 115 have a downstream side 213 wherein air flows away from the disks 115, and an upstream side 215 wherein air flows toward the disks 115. The drive 111 also has a bypass channel 219 formed in the housing 113 for directing the air flow generated by rotation of the disks 115 from the downstream side 213 of the disk pack or disks 115 to the upstream side 215 of the disk pack or disks 115.

In the embodiment shown, the bypass channel 219 is located between an outer perimeter 217 (FIG. 1) of the housing 113 and the actuator 121, such that the bypass channel 219 completely circumscribes the actuator 121. In some HDD designs where there is not sufficient space to implement a full bypass channel (shown) the bypass channel 219 may be interrupted (not shown). This is known as a partial bypass. When there is a partial bypass, the presence of a diffuser and contraction remains beneficial. Furthermore, in order to help the bypass flow negotiate substantial angular changes (channel bends), one or more turning vanes may be placed in those areas. The use of turning vanes is well known in wind tunnel design.

As shown in FIGS. 1 through 4, one embodiment of the drive 111 constructed in accordance with the present invention also comprises a diffuser 221. In the embodiment shown, the diffuser 221 is located in the bypass channel 219 and is positioned adjacent to the downstream side 213 of the disk pack or disks 115. The body of the diffuser 221 is also offset downstream from the disks 115 in the radial direction 207, such that the diffuser 221 reduces air flow drag from the disks 115 due to disk wake in the bypass channel 219. This type of aerodynamic drag is commonly called base drag.

Figure 5:
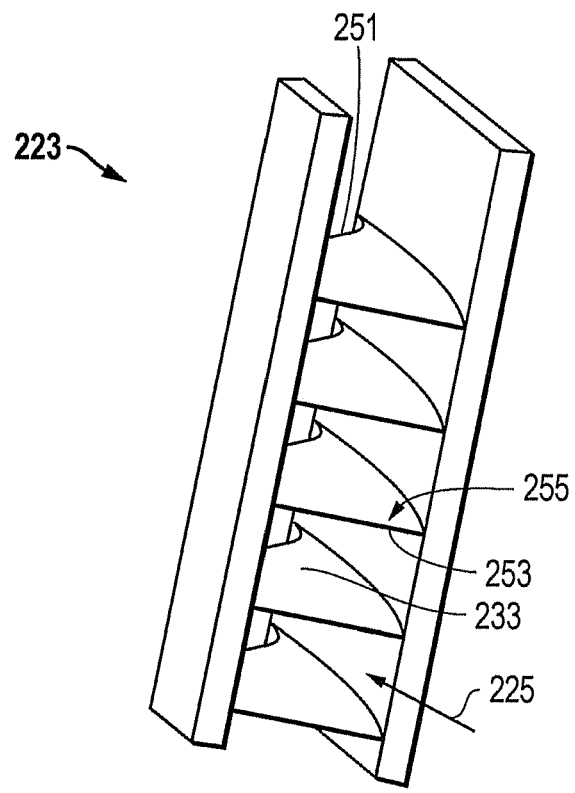
FIG. 5 is a front isometric view of a contraction for the hard disk drive of FIG. 1 and is constructed in accordance with the present invention.
Figure 6:
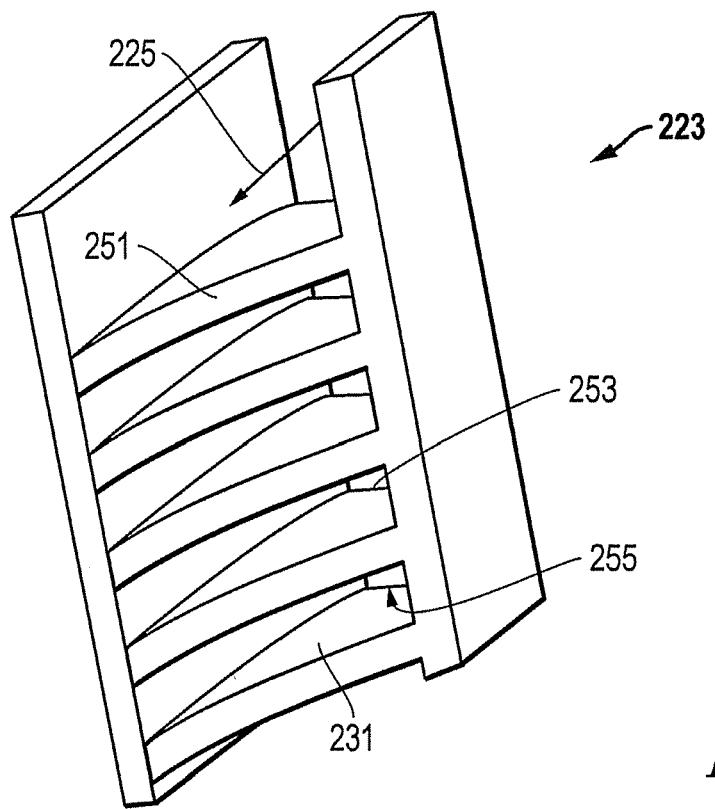
FIG. 6 is a rear isometric view of the contraction of FIG. 5, and is constructed in accordance with the present invention.

Alternatively, or operating in conjunction with the diffuser 221, another embodiment of the drive 111 may include a contraction device or contraction 223 (FIGS. 5 and 6). The contraction 223 is also located in the bypass channel 219, but is adjacent to the upstream side 215 of the disk pack or disks 115. Like the diffuser 221, the contraction 223 is offset upstream from the disks 115, but in a radial direction 209. Each of the diffuser 221 and the contraction 223 may be spaced apart from outer edges 213, 215, respectively, of the disks 115 in radial directions 207, 209, respectively, by, for example, no more than approximately 0.5 mm. The contraction 223 is provided for re-accelerating a slow bypass air flow 225 (FIGS. 1, 5, and 6) from the contraction 223 to the disks 115 to provide efficient energy conversion for the air flow from pressure energy to kinetic energy prior to merging the slow bypass air flow 225 with air flow 205 (FIG. 1) around the disks 115.

In another embodiment of the present invention, each of the diffuser 221 and/or the contraction 223 may further comprise an air filter(s) 222 (FIG. 1) for filtering the air flowing through the bypass channel 219 and/or housing 113. Either or both structures 221, 223 may be configured to perform this filtration function, in which case they may be formed from a filtration substance. In one particular embodiment, the diffuser 221 and the contraction 223 incorporate electrical charges to filter the air flowing through the bypass channel 219 and/or housing 113. The efficacy of the filtration material may be enhanced, for example, by incorporation of electric charges (electret).

In the embodiments illustrated, both the diffuser 221 and the contraction 223 are equipped with a plurality of airfoils 231, 233, respectively. The airfoils 231, 233 may be identical but, as shown in the illustrations, they may be configured differently as well. The airfoils 231, 233 are axially apart from each other, respectively, in the axial direction. Each of the airfoils 231, 233 has a generally planar orientation in the radial direction. As shown, for example, in FIG. 4, the airfoils 231 (only one shown for clarity) are axially aligned with one of the disks 115. The airfoils 231, 233 also having a maximum axial thickness 235 (FIG. 2) that is preferably equal to an axial thickness 237 (FIG. 4) of a respective one of the disks 115. The diffuser shape must be such as to promote adherence of the flow to the surface while avoiding flow separation. It is well known in the art that flow separation occurs when the diffuser widens too suddenly. Furthermore, it will be understood that an array of flow conditioning measures can be applied to the basic diffuser shape shown for the purpose of promoting adherence of the flow to the diffuser walls. Among these measures are turbulators consisting of surface roughness elements, for example ridges, vortex generators, boundary layer tripping devices and the like. Other flow conditioning measure is irradiation of the flow with sound. The mentioned flow conditioning techniques are known in the art of aerodynamic design.

Each of the airfoils 231 of the diffuser 221 has a leading edge 241 with a generally cylindrical transverse surface 243 extending in the axial direction that flatly faces the disks 115. Transverse surface 243 is located immediately adjacent to a respective one of the disks 115 (see FIGS. 1 and 4) and is substantially perpendicular to a planar orientation of a respective one of the disks 115. Each of the airfoils 233 of the contraction 223 has a trailing edge 251 located immediately adjacent to a respective one of the disks 115, and a leading edge 253 with a rounded surface 255 that is located opposite the trailing edge 251.

The leading edges 241 of the airfoils 231 of the diffuser 221 and the trailing edges 251 of the airfoils 233 of the contraction 223 have arcuate contours that are complementary in shape with respect to circular outer edges 213, 215 of the disks 115. The airfoils 231 of the diffuser 221 also have trailing portions 245 located opposite the leading edges 241. The trailing portions 245 taper down in axial thickness in the air flow direction away from the disks 115 to define gradually expanding passages 249. The air flow transitions from the disks 115 to the trailing portions 245 along the tapers to gradually decrease a speed of the air flow.

Figure 2:
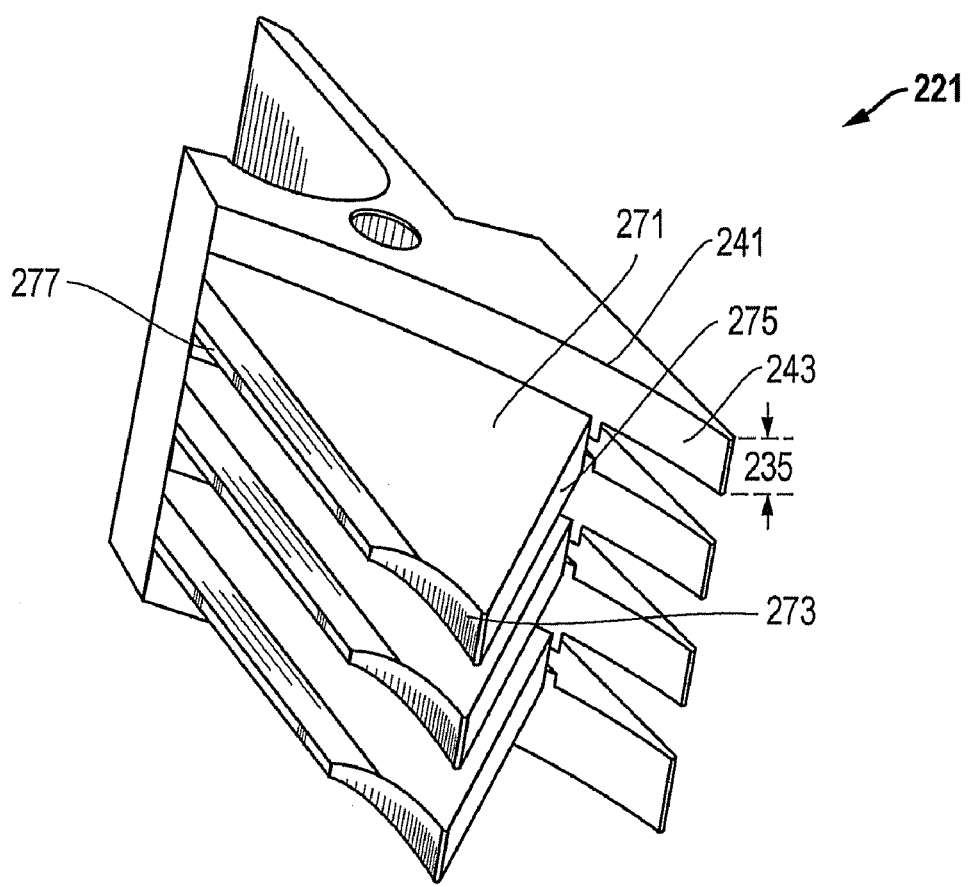
FIG. 2 is a front isometric view of a diffuser for the hard disk drive of FIG. 1 and is constructed in accordance with the present invention.
Figure 3:
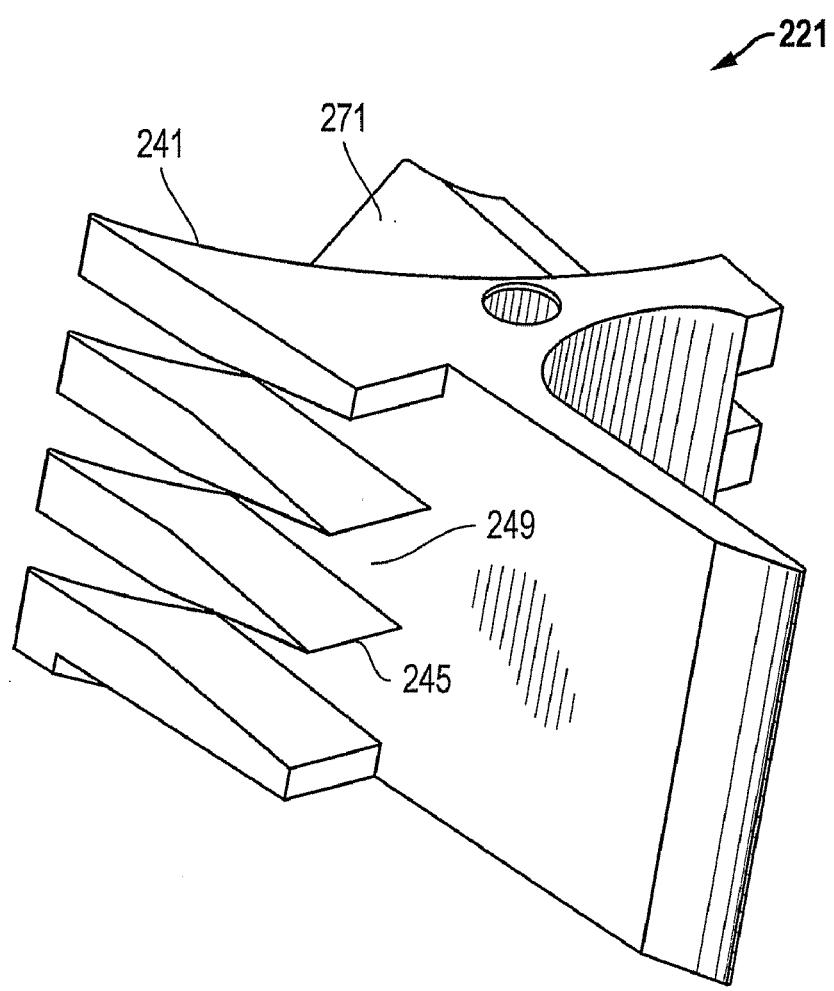
FIG. 3 is a rear isometric view of the diffuser of FIG. 2, and is constructed in accordance with the present invention.

As shown in FIGS. 2–4, the tapers on the airfoils 231 of the diffuser 221 are smooth and edge-free from the leading edges 241 to the trailing portions 245. Alternatively, the tapers may be configured with linear tapers. The airfoils 233 (FIGS. 5–6) of the contraction 223 may be provided with similar smooth and edge-free tapers extending from their respective leading edges 253 to their respective trailing edges 251. In addition, the trailing portions 245 of the airfoils 231 of the diffuser 221 and the leading edges 253 of the airfoils 233 of the contraction 223 have linear edges that are substantially perpendicular to the directions of the air flow at the downstream and upstream sides 213, 215, respectively, of the disk pack or disks 115. Furthermore, the leading edges 253 of the airfoils 233 of the contraction 223 are preferably rounded 255, as shown in FIGS. 5 and 6.

The diffuser 221 is also provided with a plurality of integrally formed air diverter fins 271. There are at least two air diverter fins 271, each of which is located adjacent to one planar surface of the disk 115, as shown in FIGS. 1 and 4. Thus, in one embodiment, the diffuser 221 has a total of "n+1" air diverter fins 271, wherein "n" is the number of disks 115 in the disk pack. The air diverter fins 271 are shown as generally triangular in shape in the version illustrated, but may comprise other shapes as well, such as rectangular or polygonal shapes. The air diverter fins 271 protrude radially from surfaces 243 of airfoils 231 of the diffuser 221 into the disk pack generally toward the hub 117 of the disk pack. Each fins 271 converges to a leading tip 273 and has edges 275, 277 that diverge from the leading tip 273. In the embodiment shown, edges 275, 277 are generally perpendicular to the surfaces of the disks 115. However, edge 277 is longer than edge 275 and has a tapered profile that is not as blunt as the profile of edge 275. The axial thickness of each fin 271 may be less than, equal to, or greater than the axial thickness 235 of airfoils 231.

The present invention has several advantages, including the ability to streamline air flow in a hard disk drive. The volumetric flow rate of air can be increased with the presence of the diverter, which channels the air into the bypass channel through the diffuser portion. The air flow is smoothed into the bypass channel with a stationary afterbody. The diffuser and integrated air diverter fins provide a gradual expanding passage so that the speed of the air flow can gradually decrease and the pressure can rise. This design reduces losses in system momentum due to sudden expansion of the air or gas in the drive, and ensures a smooth recovery of pressure from kinetic energy in the entering flow field. As a result, the amount of power required by the spindle motor is reduced. Alternatively, air flow moving toward the disk pack is contracted to allow efficient energy conversion from pressure energy to kinetic energy prior to merging of the bypass air flow with the air flow among the disks. The structure also may be used to filter the air flow. It will be understood that the present invention encompasses designs in which the diffuser or contraction are not implemented. The usual reason being interference with other drive components.

While the invention has been shown or described in only some of its forms, it should be apparent to those skilled in the art that it is not so limited, but is susceptible to various changes without departing from the scope of the invention.

What is claimed is:

1. A hard disk drive, comprising:
   a housing;
   a disk mounted to the housing and being rotatable relative to the housing, the disk defining an axis of rotation and a radial direction relative to the axis, and the disk having a downstream side wherein air flows away from the disk, and an upstream side wherein air flows toward the disk;
   an actuator mounted to the housing and being movable relative to the disk, the actuator having a head for reading data from and writing data to the disk;

a bypass channel formed in the housing for directing air flow generated by rotation of the disk; and a diffuser located in the bypass channel adjacent to a downstream side of the disk and having a plurality of air diverter fins that protrude radially with respect to the disk, such that the diffuser reduces drag from the disk due to disk wake in the bypass channel.

2. The hard disk drive of claim 1, wherein the air diverter fins of the diffuser are triangular in shape, including a leading tip and edges that diverge from the leading tip toward the diffuser.

3. The hard disk drive of claim 2, wherein the diffuser has air foils and the air diverter fins protrude from surfaces of the airfoils toward a hub of the disk.

4. The hard disk of claim 3, wherein the edges of the air diverter fins are perpendicular to a recording surface of the disk.

5. The hard disk drive of claim 2, wherein one of the edges of each of the air diverter fins is longer than another one of the edges of the air diverter fins and has a tapered profile that is not as blunt as a profile of said another one of the edges.

6. The hard disk drive of claim 3, wherein each of the air diverter fins has an axial thickness that is equal to an axial thickness of the airfoils.

7. The hard disk drive of claim 1, wherein the diffuser further comprises an air filter for filtering the air flowing through the housing.

8. The hard disk drive of claim 1, wherein the bypass channel is located between an outer perimeter of the housing and the actuator, such that the bypass channel completely circumscribes the actuator.

9. The hard disk drive of claim 1, wherein the diffuser has an air foil having a generally planar orientation in the radial direction and being axially aligned with a planar orientation of the disk, the air foil also having a maximum axial thickness that is less than or equal to an axial thickness of the disk.

10. The hard disk drive of claim 1, wherein the bypass channel is a full bypass that extends from the downstream side of the disk to an upstream side of the disk.

11. A hard disk drive, comprising:

a housing;

a disk pack mounted to the housing and having a plurality of disks that are rotatable relative to the housing, the disk pack defining an axis of rotation and a radial direction relative to the axis, and the disk pack having a downstream side wherein air flows away from the disks, and an upstream side wherein air flows toward the disks;

an actuator mounted to the housing and being movable relative to the disk pack, the actuator having a plurality of heads for reading data from and writing data to the disks;

a bypass channel formed in the housing for directing the air flow generated by rotation of the disks from the downstream side of the disk pack to the upstream side of the disk pack;

a diffuser located in the bypass channel adjacent to the downstream side of the disk pack, the diffuser having a plurality of airfoils and integrally formed air diverter fins radially oriented with respect to the disks, such that the diffuser reduces air flow drag from the disks due to disk wake in the bypass channel; and a contraction located in the bypass channel adjacent to the upstream side of the disk pack and offset upstream from the disks in the radial direction, such that the contraction re-accelerates a slow bypass air flow from the contraction to the disks to provide efficient energy conversion for the air flow from pressure energy to kinetic energy prior to merging the slow bypass air flow with air flow around the disks.

12. The hard disk drive of claim 11, wherein the air diverter fins of the diffuser are triangular in shape, including a leading tip and edges that diverge from the leading tip toward the diffuser.

13. The hard disk drive of claim 12, wherein the air diverter fins protrude from surfaces of the airfoils toward a hub of the disk, and the edges of the air diverter fins are perpendicular to recording surfaces of the disks.

14. The hard disk drive of claim 12, wherein one of the edges of each of the air diverter fins is longer than another one of the edges of the air diverter fins and has a tapered profile that is not as blunt as a profile of said another one of the edges.

15. The hard disk drive of claim 11, wherein each of the air diverter fins has an axial thickness that is equal to an axial thickness of the airfoils.

16. The hard disk drive of claim 11, wherein each of the diffuser and the contraction further comprise an air filter for filtering the air flowing through the bypass channel.

17. The hard disk drive of claim 11, wherein the bypass channel is located between an outer perimeter of the housing and the actuator, such that the bypass channel completely circumscribes the actuator.

18. The hard disk drive of claim 11, wherein both the diffuser and the contraction have a plurality of airfoils that are axially apart from each other, respectively, in the axial direction, each of the airfoils having a generally planar orientation in the radial direction and being axially aligned with one of the disks, the airfoils also having a maximum axial thickness that is less than or equal to an axial thickness of said one of the disks.

19. The hard disk drive of claim 11, wherein each of the airfoils of the diffuser has a leading edge with a flat transverse surface extending in the axial direction that is located immediately adjacent to said one of the disks and is substantially perpendicular to a planar orientation of said one of the disks, and wherein each of the airfoils of the contraction has a trailing edge located immediately adjacent to said one of the disks, and a leading edge with a rounded surface that is located opposite the trailing edge.

* * * * *